(12) United States Patent
Self et al.

(10) Patent No.: US 7,890,235 B2
(45) Date of Patent: Feb. 15, 2011

(54) DETERMINATION OF REMOTE CONTROL OPERATOR POSITION

(75) Inventors: Kelvin P. Self, Stillwater, OK (US); Nathan Kiner, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 1136 days.

(21) Appl. No.: 11/441,690

(22) Filed: May 26, 2006

(65) Prior Publication Data

US 2006/0271263 A1 Nov. 30, 2006

Related U.S. Application Data

(60) Provisional application No. 60/685,744, filed on May 27, 2005.

(51) Int. Cl.
*G06F 19/00* (2006.01)

(52) U.S. Cl. ............................. 701/50; 701/1; 701/36; 701/200; 340/539.1; 340/539.22; 340/573.1; 340/679; 342/357.57; 342/357.75; 414/699; 414/744.3; 901/1; 901/32

(58) Field of Classification Search .................. 701/50, 701/1, 200
See application file for complete search history.

(56) References Cited

U.S. PATENT DOCUMENTS

| | | | |
|---|---|---|---|
| 4,776,750 A | 10/1988 | Griswold, Jr. et al. | |
| 5,198,800 A * | 3/1993 | Tozawa et al. | 340/573.1 |
| 5,524,368 A | 6/1996 | Struck et al. | |
| 5,570,992 A * | 11/1996 | Lemelson | 414/744.3 |
| 5,713,419 A | 2/1998 | Kaczmarski et al. | |
| 5,823,707 A | 10/1998 | Lodovico | |
| 5,939,986 A * | 8/1999 | Schiffbauer et al. | 340/573.1 |
| 5,954,143 A | 9/1999 | McCabe et al. | |
| 5,957,213 A | 9/1999 | Loraas et al. | |
| 6,061,617 A * | 5/2000 | Berger et al. | 701/50 |
| 6,563,430 B1 * | 5/2003 | Kemink et al. | 340/825.49 |
| 6,614,721 B2 | 9/2003 | Bokhour | |
| 6,647,328 B2 * | 11/2003 | Walker | 701/36 |

(Continued)

OTHER PUBLICATIONS

Diesel Progress North Amercan Edition, "Remote Control Compaction", web page, Mar. 2005, 1 page.

(Continued)

*Primary Examiner*—Khoi Tran
*Assistant Examiner*—Jonathan L Sample
(74) *Attorney, Agent, or Firm*—Tomlinson Rust McKinstry Grable

(57) ABSTRACT

A system for controlling a work machine and work tool from a remote controller. The remote controller sends a control signal to a receiver assembly and machine controller. The machine controller processes the control signal to determine the location of the remote controller relative to the receiver assembly and to alter operational characteristics of the machine or work tool based on the control signal or the location of the remote controller relative to the receiver assembly. The system may include a tag system to detect the presence of workers at the jobsite and to alter operation of the machine and work tool based upon the location of the workers relative to the machine or work tool. In another embodiment, a signal may be transmitted from the work machine and detected by a remote receiver assembly. A processor uses the detected signal to determine the position of the remote receiver assembly relative to the work machine.

36 Claims, 8 Drawing Sheets

U.S. PATENT DOCUMENTS

| | | | |
|---|---|---|---|
| 6,662,881 B2 | 12/2003 | Domann | |
| 6,708,385 B1 * | 3/2004 | Lemelson | 29/563 |
| 6,784,800 B2 * | 8/2004 | Orzechowski | 340/679 |
| 6,810,353 B2 | 10/2004 | Schiffbauer | |
| 6,845,311 B1 * | 1/2005 | Stratton et al. | 701/50 |
| 6,871,712 B2 | 3/2005 | Koch et al. | |
| 6,923,285 B1 | 8/2005 | Rossow et al. | |
| 6,963,278 B2 * | 11/2005 | Frame | 340/539.22 |
| 7,062,381 B1 * | 6/2006 | Rekow et al. | 701/300 |
| 7,079,931 B2 * | 7/2006 | Sahm et al. | 701/50 |
| 7,081,606 B2 * | 7/2006 | Osaragi et al. | 250/206.1 |
| 7,268,700 B1 * | 9/2007 | Hoffberg | 340/905 |
| 7,310,439 B2 * | 12/2007 | Silverstein | 382/153 |
| 7,353,089 B1 * | 4/2008 | McEvoy | 701/2 |
| 7,400,959 B2 * | 7/2008 | Price et al. | 701/50 |
| 2004/0049324 A1 * | 3/2004 | Walker | 701/1 |
| 2005/0107934 A1 * | 5/2005 | Gudat et al. | 701/50 |
| 2006/0173600 A1 * | 8/2006 | Dietsch et al. | 701/50 |

OTHER PUBLICATIONS

NBB Controls & Components AG, "Radiokey®", web page, 1 page, Sep. 2006.

Terry Costlow, "Communicating without drivers", Article, 5 pages, Jun. 2006.

* cited by examiner

DETERMINATION OF REMOTE CONTROL OPERATOR POSITION

CROSS REFERENCE TO RELATED APPLICATION

This application claims the benefit of U.S. Provisional Application No. 60/685,744 filed May 27, 2005, the contents of which are incorporated herein by reference.

FIELD OF THE INVENTION

The present invention relates generally to the operation of a remote controlled work machine and in particular to controlling operation and movement of the work machine based upon the position of an operator or observer relative to the work machine.

SUMMARY OF THE INVENTION

The present invention is directed to a system for controlling operation of a work machine. The system comprises a signal system positionable at a location remote from the work machine and a controller assembly. The signal system comprises a signal generator adapted to generate a control signal. The controller assembly is supported by the work machine and comprises a receiver assembly and a processor. The receiver assembly comprises a plurality of receiving antennas adapted to detect the control signal from the signal generator. The processor is adapted to determine a location of the signal system relative to the receiver assembly using the detected control signal and to change an operational characteristic of the work machine based upon either the control signal or the determined location of the signal system relative to the receiver assembly.

The present invention further includes a system comprising a work machine, a signal system positionable at a remote location from the work machine, and a controller assembly supported by the work machine. The signal system comprises a signal generator adapted to generate a control signal. The controller comprises a receiver assembly adapted to detect the control signal from the signal system and a processor. The processor is adapted to determine a location of the signal system relative to the receiver assembly using the detected control signal and to control or alter an operational characteristic of the work machine based upon the control signal or determined position of the signal system relative to the receiver assembly.

Further still, the present invention includes a work machine operable in response to a control signal generated by a signal system. The work machine comprises a controller assembly. The controller assembly comprises a receiver assembly adapted to detect the control signal from the signal system and a processor. The processor is adapted to determine a position of the signal system relative to the receiver assembly using the detected control signal and to control or alter an operational characteristic of the work machine based upon the control signal or determined position of the signal system relative to the receiver assembly.

Still yet, the present invention includes a method for controlling operation of a work machine comprising a plurality of operational characteristics. The method comprises generating a control signal at a location remote from the work machine and detecting the control signal at the work machine. The method further includes determining a point of origin of the control signal relative to the work machine and controlling or altering at least one of the plurality of operational characteristics of the work machine based upon the control signal and the determined point of origin of the control signal.

The present invention is also directed to a method for controlling a work machine comprising a work tool. The method comprises determining the type of work tool and loading operational characteristics of the work machine and the work tool based upon the type of work tool. An operational boundary of the work tool is then defined by the type of work tool and configuration of the work machine. The location of a remote control system relative to the operational boundary is determined and operational characteristics of the work tool based upon the location of the remote control system relative to the operational boundary is determined based on the determined location of the remote control system.

The invention further includes a system for controlling operation of a work machine. The system comprises a plurality of transmitters supported by the work machine, a remote receiver, and a processor. The plurality of transmitters each transmits a uniquely identifiable electromagnetic field. The remote receiver assembly is adapted to detect each unique electromagnetic field from the plurality of transmitters. The processor is adapted to determine a position of the remote receiver relative to the work machine using the detected electromagnetic fields.

Further still, the present invention includes a method for controlling operation of a work machine. The method comprises transmitting a plurality of machine signals from the work machine and detecting each of the plurality of machine signals at a receiver assembly remote from the work machine. The detected machine signals are processed to determine the location of the receiver assembly relative to the work machine and a control signal is transmitted from the receiver assembly to the work machine to control or alter an operational characteristic of the work machine based upon the determined location of the receiver assembly relative to the work machine.

The present invention is also directed to a method for controlling operation of a work machine. The method comprises determining at least two operational sectors defined by the work machine and transmitting a scanning machine signal from the work machine. The scanning machine signal is detected at a receiver assembly and a control signal is transmitted from the receiver assembly to the work machine in response to detecting the scanning machine signal at the receiver assembly. The control signal is received at the work machine and processed to determine which of the at least two operational sectors the receiver assembly is located in. An operational characteristic of the work machine is controlled or altered based upon the determined location of the receiver assembly.

BRIEF DESCRIPTION OF THE DRAWINGS

FIG. 1 shows an operator using a remote controller to control operational characteristics of the work machine and a work tool supported thereon.

FIG. 2 illustrates the use of operational sectors to control or alter the operational characteristics of the work machine based upon the location of the operator within a certain operational sector.

FIG. 6 is a perspective view of a receiving assembly of the present invention suitable for use with the beacon-tracker system of FIG. 5.

FIG. 9 is a continuation of the flow chart of FIG. 8, showing a process for detecting the location of any authorized workers or observers within the operational boundary of the work machine.

DESCRIPTION OF THE INVENTION

The invention of the present application provides a method and apparatus directed to reducing worksite accidents by altering or controlling an operational characteristic of either or both a work machine and work tool based upon the position of a remote operator and/or the position of a member of the work crew, relative to the work machine.

Figure 1:
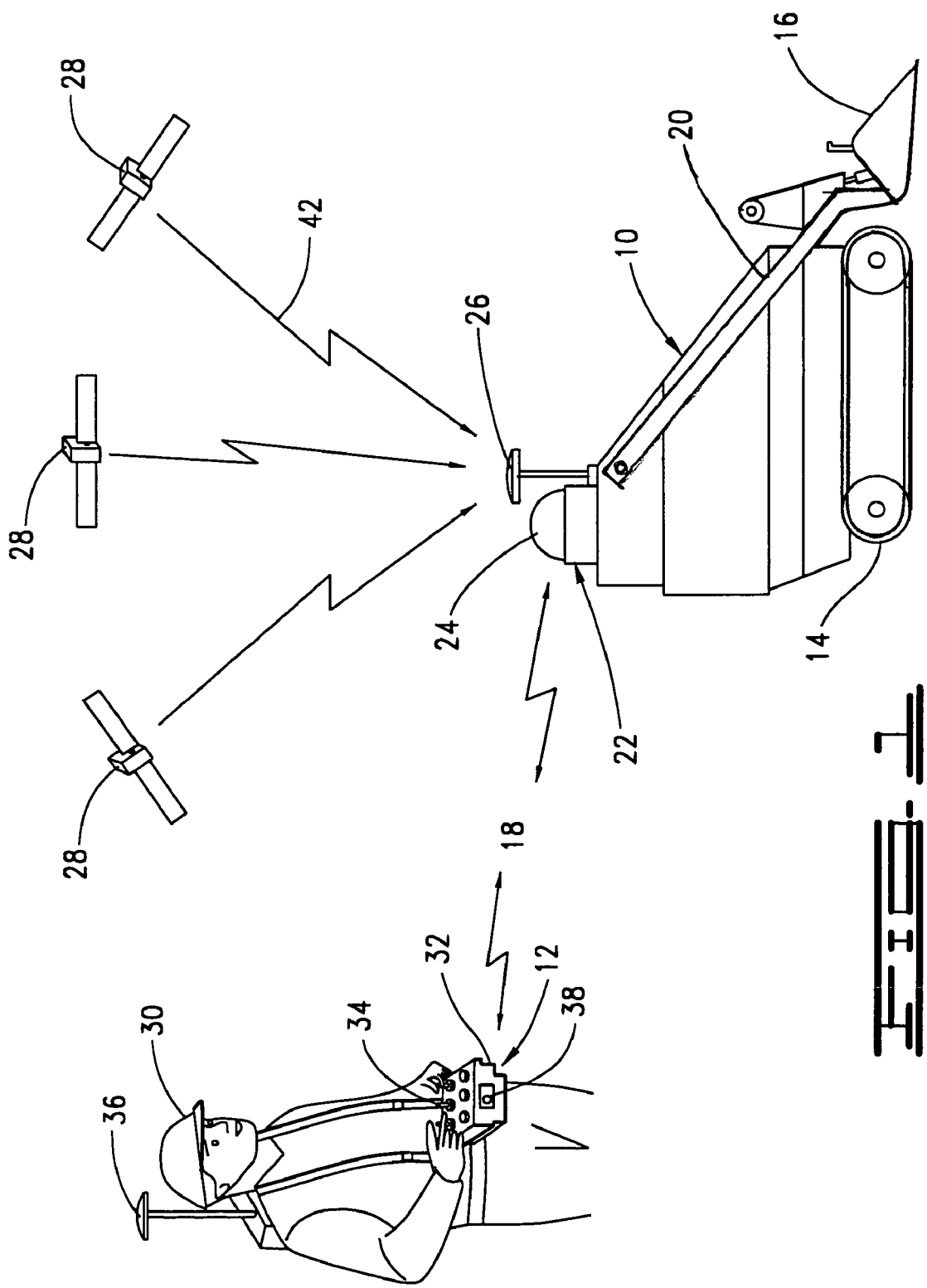
FIG. 1 is a diagrammatic representation of a remote controlled work machine constructed in accordance with the present invention.

Turning to the figures and more specifically to FIG. 1, there is shown therein a system for controlling operation of a work machine 10. The system shown in FIG. 1 comprises a work machine 10 and a remote controller 12 used to control the work machine from a remote location. The work machine 10 shown in FIG. 1 comprises a small loader with a track-laying undercarriage 14. Such a work machine 10 belongs to the "tool carrier" class of machines frequently utilized on construction and earthmoving work sites. The "tool carrier" classification implies that the work machine 10 is adaptable to a variety of tasks through interchangeable work tools 16 comprising a plurality of operational characteristics controlled in response to a control signal 18 from the remote controller 12. For purposes of illustration, the work tool 16 shown in FIG. 1 comprises a front-end loader bucket attachable to a movable arm 20 or other positioning mechanism. A wide variety of work machines 10 can be classified as tool carriers, including skid steer loaders and compact excavators. One skilled in the art will appreciate that a wide variety of work machines 10 may be remotely controlled in accordance with the present invention.

The work machine 10 may comprise a controller assembly 22 supported by the work machine and comprise a receiver assembly 24 and a processor (not shown). The receiving assembly 24 may comprise a bi-directional communication system for communicating with the remote controller 12 and a Global Positioning Satellite ("GPS") receiver 26 adapted to receive signals 42 from a plurality of GPS satellites 28. The receiving assembly 24 is adapted to detect the control signals 18 from the remote controller 12. These control signals 18 are used to control or alter a variety of work machine 10 operational characteristics. Control signals 18 are detected by the receiving assembly 24 and processed by the processor (not shown) to determine a location of an operator 30 carrying the remote controller 12. Additionally, the processor uses the detected signals to change or alter an operational characteristic of the work machine 10 based upon the location of the operator 30 in relation to the work machine or based upon the control signal 18 from the remote controller 12 in a manner yet to be described. In addition to the signal receiving assembly 24, the controller assembly 22 may comprise a machine transmitter assembly (not shown) adapted to transmit machine signals (discussed hereinafter) to the signal system of the remote controller 12. Such work machine operation information may comprise current operational status of the work machine 10.

The remote controller 12 may comprise a portable frame 32 that can be worn or carried by an operator 30, a signal system having a signal generator (not shown), and at least one user input device 34. The signal system comprises a signal generator adapted to generate the previously discussed control signal 18. One skilled in the art will appreciate that several commercially available signal generators would be appropriate for the purpose of generating the control signal 18. For example, the signal generator may comprise an ultrasonic signal generator adapted to transmit an ultrasonic control signal 18. The control signal 18 may serve a wide variety of uses such as communicating a control command to the controller assembly 22 or for determining the location of the remote controller 12 relative to the work machine 10. Additionally, the remote controller 12 may comprise a GPS receiving antenna 36 that may be used in cooperation with the work machine GPS receiving antenna 26 to determine the location of the remote controller 12 relative to the work machine 10.

Continuing with FIG. 1, the operator 30 remotely controls the work machine 10 and work tool 16 by activating at least one user input device 34 adapted to generate the control command for communication to the controller assembly 22. The user input devices 34 may comprise switches, joysticks, or other input devices regularly used on known remote control systems. Additionally, the user input device 34 may comprise a system for controlling the work machine 10 in response to voice commands. Although wireless remote control is preferred, one skilled in the art will appreciate that a wired cable may be used for bi-directional communication between the remote controller 12 and the work machine 10.

In addition to the control signal 18 transmitted by the remote controller 12, each authorized worker may have an "identifier", such as a Radio Frequency Identification ("RFID") tag or reflector 38 to allow the system to detect and track multiple personnel in the local work area around the machine 10. The "identifier" or "tag" 38 may be worn on the person and can be made individually unique. For example, in its response to being impinged by the machine signal, the identifier 38 may send a certain characteristic return radio frequency signal to the receiving assembly 24. Accordingly, the machine controller 22 of the receiving assembly 24 has knowledge of the number of authorized persons present in the work area and can adjust itself to track each person. When an identifier 38 is worn by the operator 30 instead of (or in addition to) being mounted to the remote controller 12, its particular characteristic return signal can be distinguished by the controller 22 to verify there is a properly qualified person at the controls. Having identifiers 38 on both the operator 30 and on the remote controller 12 additionally allows the controller 22 to confirm that the operator and the remote controller are in approximately the same location.

Figure 2:
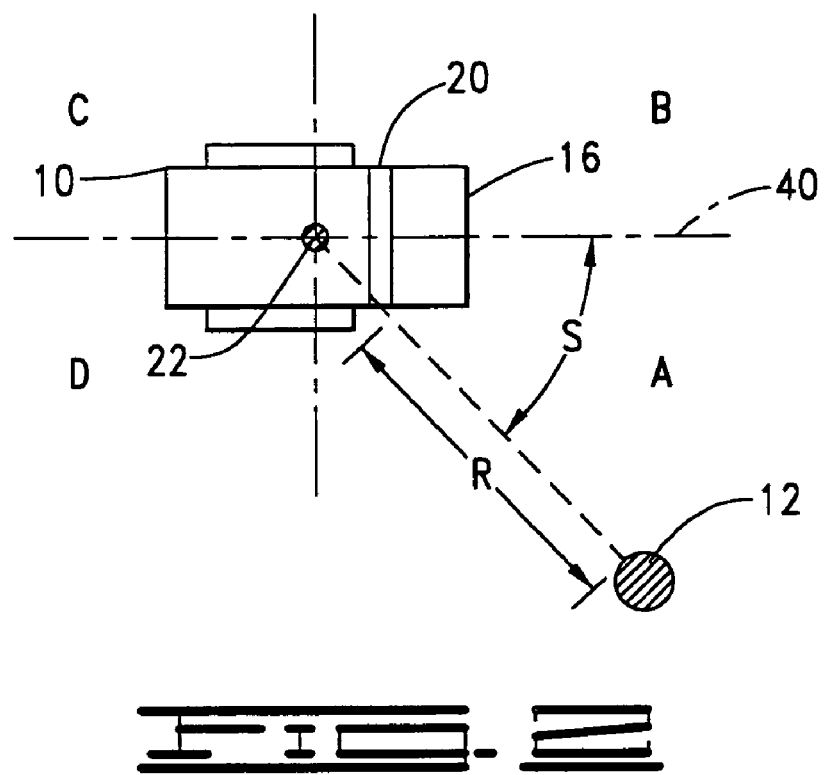
FIG. 2 is an overhead view of the remote controlled work machine shown in FIG. 1.
Figure 3:
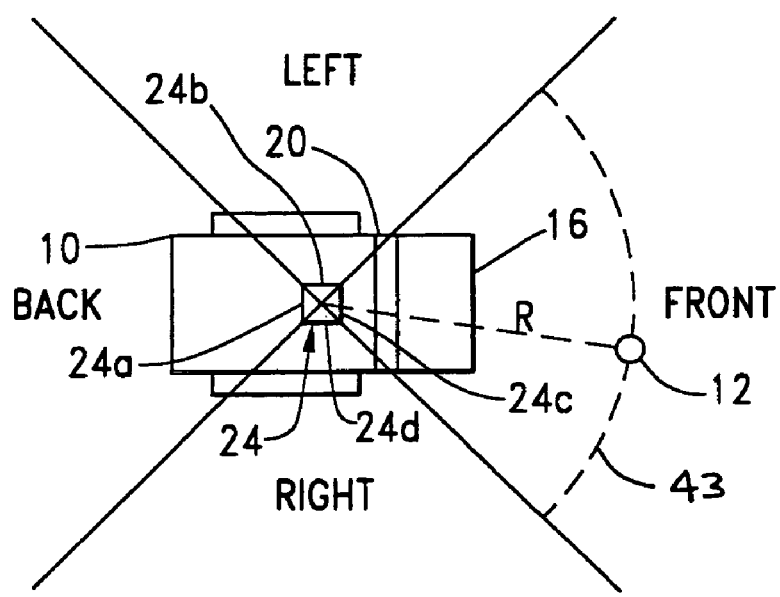
FIG. 3 is an overhead view of the remote controlled work machine of FIG. 2 showing the operational sectors shifted to comprise front, back, left, and right sectors.

Referring now to FIGS. 1 and 2, the relative location of the remote controller 12 may be expressed in terms of (1) an approximate radial clearance R between the remote controller and an operational boundary of the work machine 10 and work tool 16, and (2) a location angle S measured with respect to a frame of reference on the machine 10—such as its longitudinal centerline 40. One skilled in the art will appreciate that different or additional frames of reference may be necessary for some types of work machines 10 or work tools 16. Having determined relative location in this manner, the information may be utilized to effect automatic changes or restrictions in the operational characteristics of the work machine 10 and/or work tool 16 based upon one or both parameters R, S. Preferably both parameters are utilized. To facilitate the decision-making behind such changes, the area surrounding the work machine 10 may be divided into two or more operational sectors or angular regions. For purposes of illustration only, the area surrounding the work machine 10 in FIG. 2 has been divided into four operational sectors A, B, C, and D. Together, the operational sectors completely surround the machine 10 and the work tool 16. The operational sectors extend outward to the location or potential locations of the remote controller 12. Although not shown in FIG. 2, the angular expanse of respective operational sectors A, B, C, D may be unequal and unsymmetrical. Each is pre-defined to enclose a portion, if not all, of the unique operational features of the work machine 10. For instance the operational sectors A and B in FIG. 2 enclose symmetrical portions that encompass the operational range of the work tool 16 and its positioning arm 20 and any expanded radial area between this operational range and the present location or potential locations of the remote controller 12. Operational sectors C and D symmetrically encompass the remaining surrounding area. For some machines a possibly more useful arrangement of these sectors would be to align them with the front, rear and sides of the machine as shown in FIG. 3. And, for certain work tools 16 it may be appropriate for the outer surroundings of the work tool to be encompassed by a single operational sector. For example, the latter arrangement would be suitable for a posthole auger while drilling a vertical hole. As used herein, the term "outer surroundings" refers to the area around the work machine 10 and work tool 16 not protected or obscured from the operator 30 (FIG. 1) by the machine 10 and other components.

In the case of a machine 10 with a turret-mounted superstructure, such as a compact excavator, a set of operational sectors may be aligned to rotate with the superstructure while a different set of operational sectors could be aligned with the undercarriage 14 (FIG. 1) of the machine 10. The first set of operational sectors are used while the operator 30 is utilizing the work tool 16, while the second set of operational sectors are used when the machine 10 is being moved around the work area. Of course, during work machine 10 movements, knowing the stowed orientation of the work tool 16 with respect to the undercarriage 14 is important to insure the operator 30 is a safe distance from the work machine. The operator 30 or other worker authorized to be on the work site positioned in sectors C and D may be at risk to hazards such as run-over or being "bumped into" when the operator is backing or turning the machine 10. Sectors A and B present similar hazards, plus additional hazards related to actions of the movable arm 20 and the work tool 16—including any payload that may be involved.

Referring still to FIGS. 1 and 2, the location of the remote controller 12 relative to the work machine 10 may be determined by reception of signals 42 transmitted from the constellation of GPS satellites 28 whose signals are received by the work machine GPS receiving antenna 26 and the remote controller GPS receiving antenna 36. Preferably an inch-level accuracy GPS system is utilized, such as real-time differential GPS. One skilled in the art will appreciate that use of a local reference station (not shown) may be necessary for the real-time differential GPS to work properly. When converting the GPS coordinates into relative location (R, S) data, the elevation values of the resulting 3-D location coordinates may be ignored. To complete this conversion, the heading or orientation of the work machine 10 is determined via an on-board electronic compass (not shown), or by mounting a second GPS antenna on the work machine 10 distant from the first antenna 26. Such arrangements and the equations necessary to transform sets of GPS coordinates into relative position ("distance away" and direction) are known by those skilled in the art and do not merit further discussion herein. In the case of a work machine 10 with a turret-mounted superstructure, two spatially separated GPS antennas on the superstructure and an encoder (not shown) on the turret would provide information regarding heading and configuration of the work machine 10. Those skilled in the art can readily determine the proper set-up for other unique machine configurations within the scope of this invention.

"Distance away" may be converted into radial clearance R between the remote controller 12 and operational boundary of the machine 10 by subtracting a distance equal to the radial extent of the machine 10 beyond the mounting position of the GPS antenna 26 from the GPS determined distance. This can be accomplished through a lookup table of "work machine operational boundaries" versus relative location angle S. Some relative location angles S of the work tool 16 may be closer to the remote control operator 30 than the boundary of the work machine 10. At any given angle S, the radial clearance R can change substantially while the work tool 16 is operational. For instance with a backhoe or excavator, the work tool 16 may be moved horizontally and vertically within a vertical plane and this "plane of the tool" can be rotated with respect to the machine undercarriage 14. By knowing position of the work machine 10 in real-time and by knowing the position of the remote controller 12 with respect to the work machine, a real-time machine boundary can be created for the work machine. Then the machine controller assembly 22 automatically prevents the work tool 16 from being rotated or extended too close to or into the operator 30 because of inadvertent control actions. As the operator's control actions narrow the radial clearance R, the operator 30 may feather his control actions to slow the motion of the work tool 16 before completely over-riding the control actions whenever a set minimum clearance $R_{min}$ is reached for any particular location angle S of the operator. The operator 30 (or other authorized worker/observer) is then required to move away from the machine 10 to regain operational control. Alternately, the operator 30—upon inputting a purposeful sequence of keystrokes (or other commands)—could be granted temporary operational control for those special circumstances where close proximity operation is necessary. Such a circumstance could include troubleshooting the functional operation of the work machine 10. It will be appreciated that the principles described here also apply to converting "distance away" determined by other embodiments into radial clearance R.

Placement of encoders (not shown) or equivalent sensors at each joint of the work tool 16 and displacement sensors (not shown) in any telescopic features related to movement of the work tool will provide information useful in determining the distance the work tool extends beyond the work machine 10. This information alone or combined with determining the type of work tool 16 installed and sensing the work machine 10 and work tool operating conditions such as inclination or weight distribution with commercially available operational sensors (not shown). The operational sensors may be used to determine certain work machine and work tool operational parameters such as speed, lift, height, or reach. For a work machine 10 with a turret-mounted superstructure, the previously mentioned encoder on the turret drive provides information about its rotational movement and the associated heading of the work tool 16 with respect to the undercarriage 14 (FIG. 1). Information from the encoders may be processed to compute relative height of the work tool 16, its extension in relation to a machine reference point, and (if applicable) the orientation of the above-mentioned vertical plane with respect to the longitudinal axis of the machine's undercarriage 14. Such calculations for determining real-time work tool 16 position utilizing encoder information as discussed herein is known by one skilled in the art.

In the event multiple authorized personnel are present in the area of operation, updating their respective relative locations may be non-sequential—with priority determined by such factors as: the recent history of change to each particular set of location coordinates (R, S), the magnitude of the radial clearance R, and the orientation of the location angle S with respect to operational sectors A, B, C, D. Timely location information is then available to initiate, when necessary, the previously-mentioned automatic restrictions to the movements of the work machine 10 and/or the operations of the work tool 16.

Turning now to FIG. 3 an alternative system for determining the position of the operator 30 also relative to the work machine 10 is shown. In the system of FIG. 3, a control signal 18 (FIG. 1) is generated by a transmitter 12 carried by the operator 30. The control signal 18 (FIG. 1) may comprise a radio carrier signal used to control the work machine 10 and work tool 16. In a preferred embodiment, the transmitter 12 carried by the operator 30 sends control data packets to the work machine 10 at regular intervals. An antenna assembly 24 supported by the work machine 10 detects the control data packets and a processor in the machine controller 22 (FIG. 1) determines the position of the transmitter 12 relative to the work machine.

The antenna assembly 24 may comprise multiple uni-directional antennas such as a patch style antenna. As shown in FIG. 3, four uni-directional antennas 24a-d may be supported on the work machine 10 to divide the area surrounding the work machine into four (4) regions: front, back, left and right. It will be appreciated that the number of regions can be increased or decreased without departing from the spirit of the invention. The uni-directional antenna 24a-d receiving the strongest signal from the transmitter 12 identifies which region the operator 30 is in. The strength of the received signal may also be used to determine the distance or radial clearance (R) between the work machine 10 and the operator 30. In FIG. 3, the operator's position is shown somewhere along the dashed arc 43. Accordingly, the embodiment of FIG. 3 does not require pinpointing the operator's position. Rather, simply determining which region the operator 30 is located in and the operator's distance away (r) from the work machine 10 provides sufficient information for the machine controller 22 (FIG. 1) to make decisions, in a yet to be described manner, to control or alter at least one of the operational characteristics of the work machine 10 or work tool 16.

Figure 4:
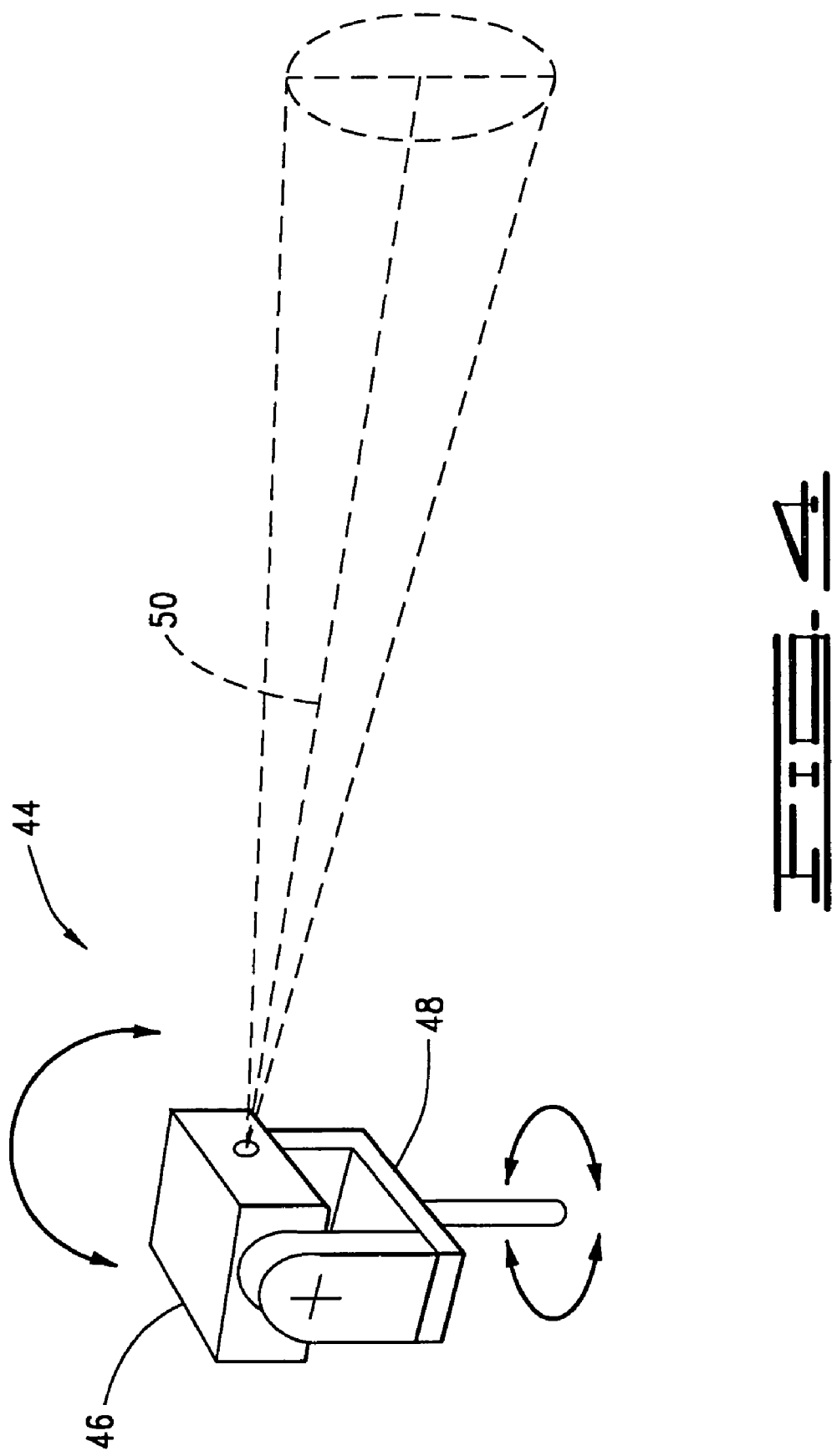
FIG. 4 is a perspective view of a gimble-mounted transmitter/receiver assembly adapted to transmit a scanning machine signal to determine the location of the operator relative to the work machine.

Referring now to FIG. 4, there is shown therein another embodiment of an antenna configuration of antenna assembly 24. The antenna assembly 24 comprises a directional antenna assembly 44 adapted to scan an area of operation to determine the location of the remote controller 12 (FIG. 1). Accordingly, the directional antenna assembly 44 may further comprise a gimble mount 46 adapted to support the directional antenna 48 on the work machine 10 (FIG. 1) for movement in at least two planes. Movement of the directional antenna 48 may be automated to scan the operational area of the work machine 10 and work tool 16 to locate the remote controller 12, any work site personnel or the operator. Alternately, the directional antenna 48 could be located at the remote controller 12, or directional antennas could be positioned at both the work machine 10 and remote controller.

The directional antenna 44 may comprise a gimble-mounted transmitting/receiving antenna 48 to provide the antenna with two axes of scanning motion. The transmitting/receiving antenna 48 sends out (transmits) signals 50 along a line or narrow path that can be scanned over an area of coverage by motorized control of the gimble mounting 46. Suitable transmitting/receiving antennas 48 include a scanning laser or a directional radio antenna. In the case of a scanning laser, the transmitted signal 50 comprises a laser beam signal 50 that is reflected back to the scanning laser by an "identifier" such as a reflector or prism 38 (FIG. 1) mounted on the remote controller 12 or on the operator 30 (or a worker and/or observer authorized to be present in the local area around the machine 10). The automated scanning laser is functionally similar to a "robotic total station" surveying instrument. The motorized gimble mounting 46 scans the laser beam 50 around the work machine 10 at differing angular trajectories until a return beam is received from the reflector 38 (FIG. 1). Then the directional antenna assembly 44 locks onto the reflector 38, staying in alignment with its present (and likely changing) position. The relative location angle S of the reflector 38 (thus the operator 30) with respect to the machine 10 is determined from encoders on the rotation axes of the gimble mounting 46. A distance away value is determined by measuring the time lapse between transmitted and reflected pulses of laser light—as done in a laser rangefinder or robotic total station. Again, a distance equal to the extension of the work machine 10 (including its work tool 16) beyond the pivotal center of the gimble mounting 46 is subtracted from the time-lapse determined distance away value to obtain the radial clearance R.

In a variation of the above embodiment, the reflector 38 may be replaced by an array of photo detectors comprising an "electric eye". The photo detectors in the electric eye measure the amount of alignment offset in the laser beam 50 and the automatic control brings the beam into proper alignment by controlling horizontal and vertical drive motors of the gimble mounting 46 for the laser 50.

When starting up the remote controlled work machine 10, the remote control operator 30 may input his/her present location with respect to the work machine through a keypad (not shown) on the remote controller 12. This could simply be a direction location (left, right, front, rear), or could also include an estimated radial clearance interval R (distance away from the work machine 10). Manual input of location would enable rapid lock-on to the position of the remote controller 12. The operator 30 may also "inform" the control system that one or more other authorized workers/observers are present on the work site.

Figure 5:
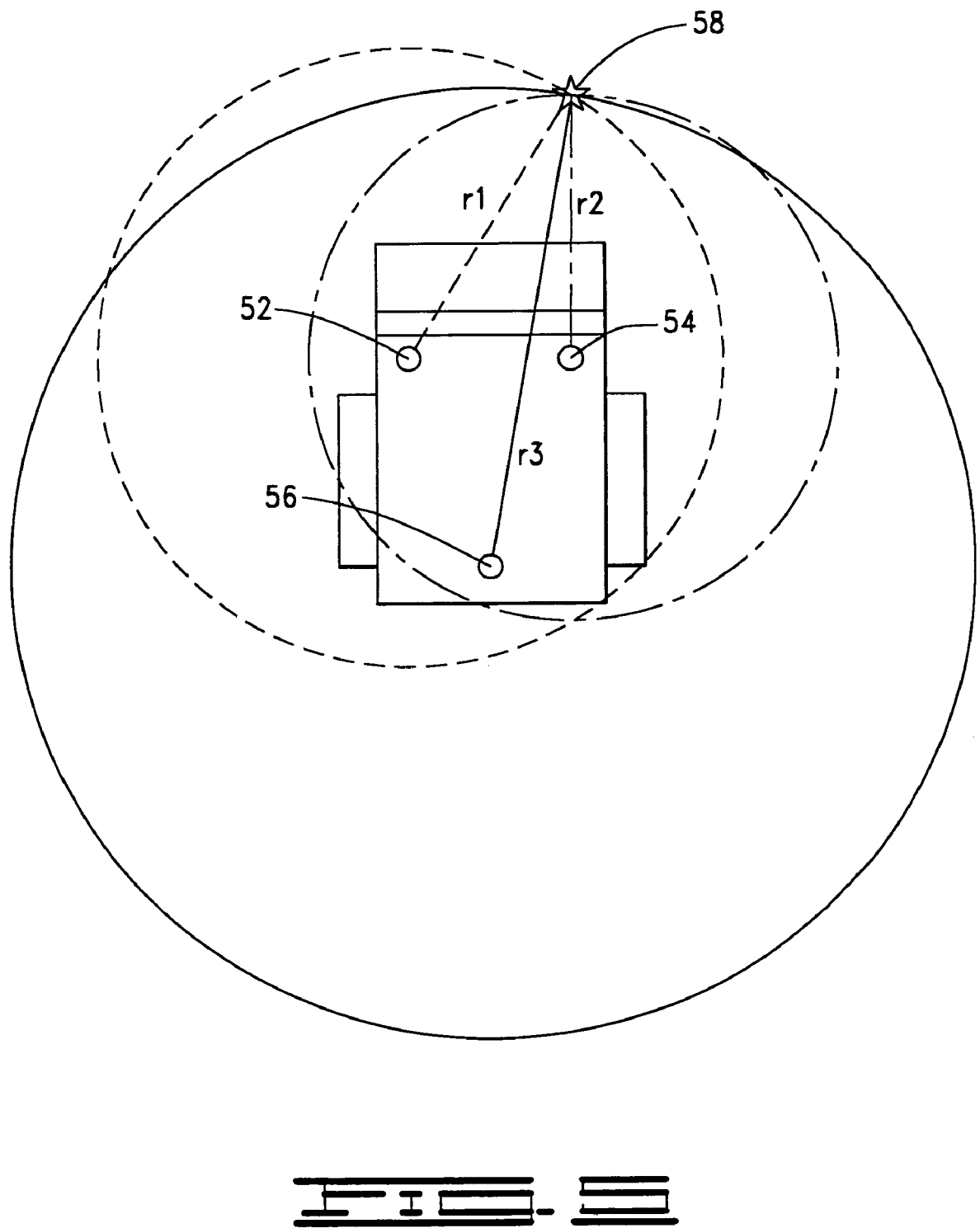
FIG. 5 is an overhead view of a remote controlled work machine depicting the use of a plurality of transmitters or receiver supported by the machine to utilize "beacon-tracker" technology to determine the location of the operator.
Figure 5:
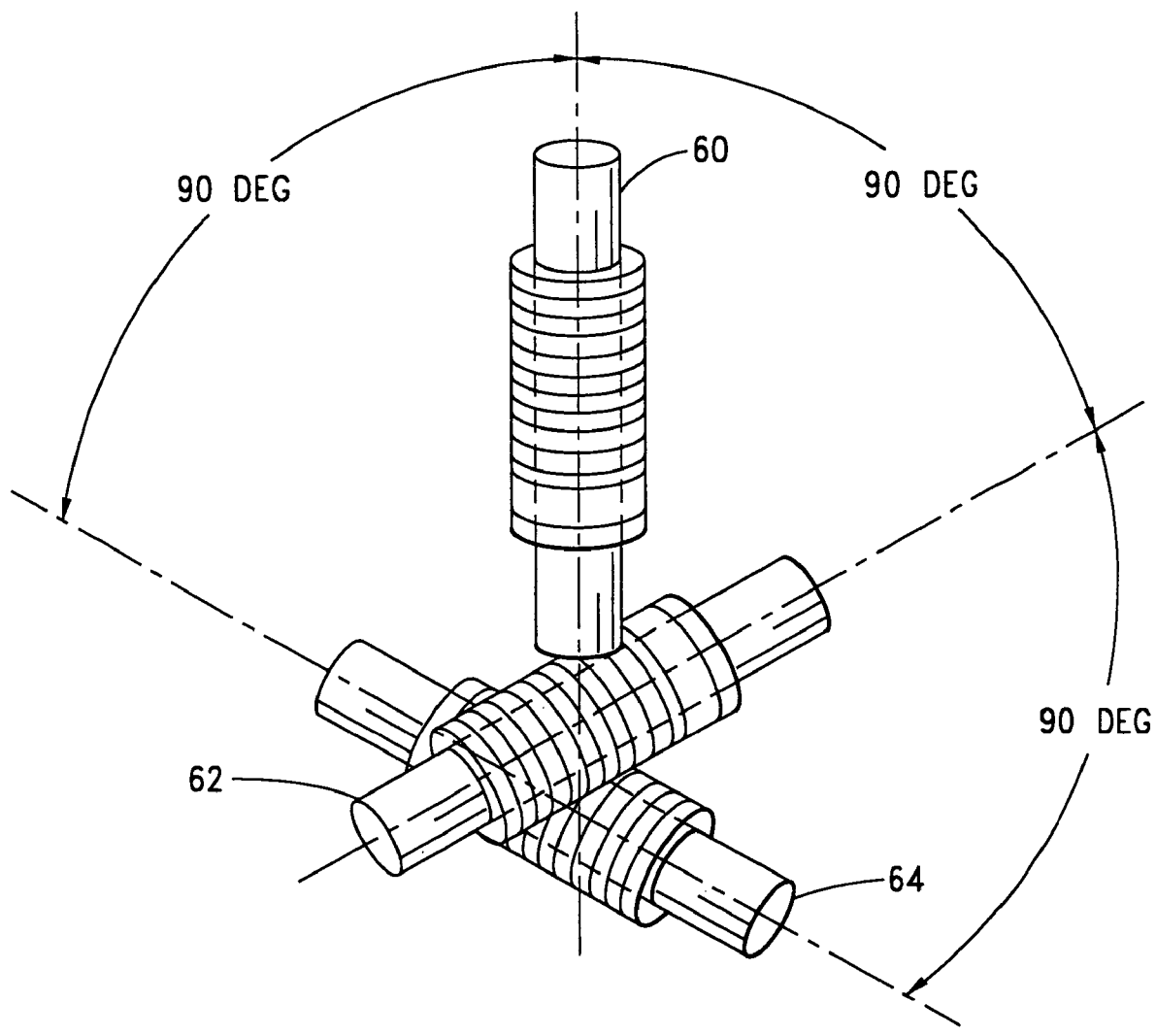

With reference now to FIG. 5, there is shown therein an alternative embodiment of the present invention. The embodiment shown in FIG. 5 comprises a system for controlling operation of a work machine 10. The system illustrated in FIG. 5 comprises a plurality of transmitters 52, 54, 56 supported on the work machine 10, a remote receiver assembly 58 and a processor (not shown) supported by the remote receiver assembly. The plurality of transmitters 52, 54, 56 are each adapted to transmit a uniquely identifiable signal from the work machine 10. The remote receiver assembly 58 is adapted to detect each unique signal from the plurality of transmitters 52, 54, 56. The processor is adapted to determine a position of the remote receiver assembly 58 relative to the work machine 10 using the detected unique signals.

The system of FIG. 5 utilizes electromagnetic field signal strength to indicate distance and direction. This technique is commonly used in tracking systems for determining position and below ground depth of underground horizontal directional drilling systems. In such tracking systems, a beacon supported in the drilling head transmits a signal to an aboveground tracker. The beacon has at least one dipole-transmitting antenna, although other antenna arrangements are possible. Appropriate calibration techniques relate the signal strength measured by the tracker to depth of the drilling head. This is analogous to the previously described "distance away" method. Here, however, one or more beacons are mounted on the machine 10 with the axis of the dipole antenna vertically oriented, while the tracking receiver antennas and associated components are incorporated into the remote receiver assembly 58. Preferably three or more transmitters are utilized—mounted in a spaced apart arrangement on the work machine 10, shown in FIG. 5.

Each of the transmitters 52, 54, 56 preferably transmits the unique electromagnetic field at a frequency of 29 kHz or less, via a ferrite core coil antenna. Each antenna employs a sufficiently different frequency to allow the remote receiver assembly 58 to differentiate between the individual transmitters. Alternately, one frequency could be utilized when the signals are modulated with a different code for each transmitter to distinguish them. When three or more transmitters are utilized, the position of the remote receiver assembly 58 with respect to the work machine 10 can be uniquely determined. By inference, this position is also the location of the operator 30. The first step toward defining this location involves estimating the radial distances $r_1$-$r_3$ between each of the transmitters 52, 54, 56 and the remote receiver assembly 58 by performing a total field calculation on each of their respective signal strengths measured by the remote receiving assembly antennas 60, 62, 64 shown in FIG. 6. Total field calculations are described in U.S. Patent Application No. 60/680,780 entitled "Dipole Locator Using Multiple Measurement Points", a commonly assigned provisional patent application filed May 13, 2005, incorporated herein by its reference.

Referring now to FIG. 6, the remote receiving assembly 58 may comprise a tracker system, which comprises a set of three antennas 60, 62, 64 in a mutually orthogonal arrangement and adapted to detect the signals transmitted by the plurality of transmitters 52, 54, 56 (FIG. 5). It will be appreciated that other antenna arrangements such as a cube antenna with multiple windings may also be suitable for application of the present invention. These antennas and associated tracker circuitry operate independently from the conventional elements of the remote receiving assembly 58. The use of three mutually orthogonal antennas 60, 62, 64 allows the processor to determine the distances $r_1$-$r_3$ between the remote receiving assembly 58 and each transmitter 52, 54, 56 (FIG. 5) regardless of orientation of the remote receiving assembly 58. The distances $r_1$-$r_3$ are transmitted to the controller 22 for processing. Circles of radii $r_1$-$r_3$ centered on respective transmitting antennas 52, 54, 56 (FIG. 5) may intersect near one common point (the operator location)—as illustrated in FIG. 5. This location is then converted into location coordinates (R, S).

An alternative embodiment of the above system may comprise transmitters positioned on the machine 10 in each of the operational sectors A, B, C, and D (FIG. 2). The remote receiving assembly 58 may then determine in which sector the receiving assembly is located by simply determining which transmitter is closest (smallest r value). Distance away and approximate location angle S are still available.

The principles of the beacon-tracker embodiment may alternately be employed in conjunction with the actual RF carrier frequency utilized to transmit the previously described control signals 18 between the remote controller 12 and the work machine controller 22. The RF carrier is preferably of a higher frequency than the frequencies of the previously described beacon transmitters. The RF carrier may be in the range from 100 MHz to 50 GHz with 900 MHz being preferable. RF carrier control signals 18 may contain information that is decoded by the controller 22 and used to control operation of the work machine 10 and work tool 16.

In any of the above embodiments, knowing whether or not the work machine 10 is in motion may simplify the control logic described hereinafter. This information can be obtained in a number of different ways, for instance by placement of encoders on the drive axles of the undercarriage 14 or through the monitoring of appropriate electrical signals within the work machine's hydraulic control system.

In accordance with the present invention, it is desirable that the system know which particular work tool 16 is installed on the work machine 10. This identification ("ID") information may be input via a keypad or automatically through intelligent attachment. As used herein the term "intelligent attachment" means to automatically conform the work machine 10 to appropriate operating modes and power output of the work machine to the needs and power requirements of the work tool 16 upon attachment of the work tool to the work machine. Intelligent attachment of the work tool 16 may interject a tool control system into the control scheme of the work machine 10. This tool control system may comprise a complex circuit with pre-wired responses based on the selected inputs from a switch bank. More preferably, the attachment comprises a microprocessor based control system that interfaces with the machine controller 22 to automatically alter certain operational functions and power outputs of the work machine 10 to suit the needs of the work tool 16.

Automatic identification of the work tool 16 attached to the work machine 10 may be accomplished through placement of an RFID tag on the work tool 16 and a corresponding reader on the machine. Each tag has a unique ID such that the reader can determine which work tool 16 is attached to the work machine 10. In a preferred embodiment, the tag reader communicates with the machine controller 22 to identify the work tool 16 attached to the work machine 10. The controller then makes decisions based on the type of work tool 16 and its operating mode. Appropriate RFID technology is available from many sources. Alternatively, if the work tool 16 comprises electrical or hydraulic circuits that are connected to corresponding circuits on the work machine 10, an ID chip on the work tool 16 is configured to electrically communicate an ID code to the machine controller 22 when physical connection occurs. It will be appreciated that a purposely-designated electrical connection may be utilized where the work tool 16 normally requires only physical connection to the machine 10. In yet another variation, a special plug with multiple pins may be utilized. Each work tool 16 would have a unique series of missing or enabled pins, thus when the unit is connected the machine controller 22 could sense which attachment is connected. Certain numbers of these pins could be shorted to certain other pins to create uniqueness. For instance, a 6-pin connector creates well over 100 unique arrangements simply by electrically shorting two or more pins together and sensing which if any pins are shorted. In such an arrangement, the machine controller 22 polls the pin arrangement to determine the exact combination of pin connections.

Figure 7:
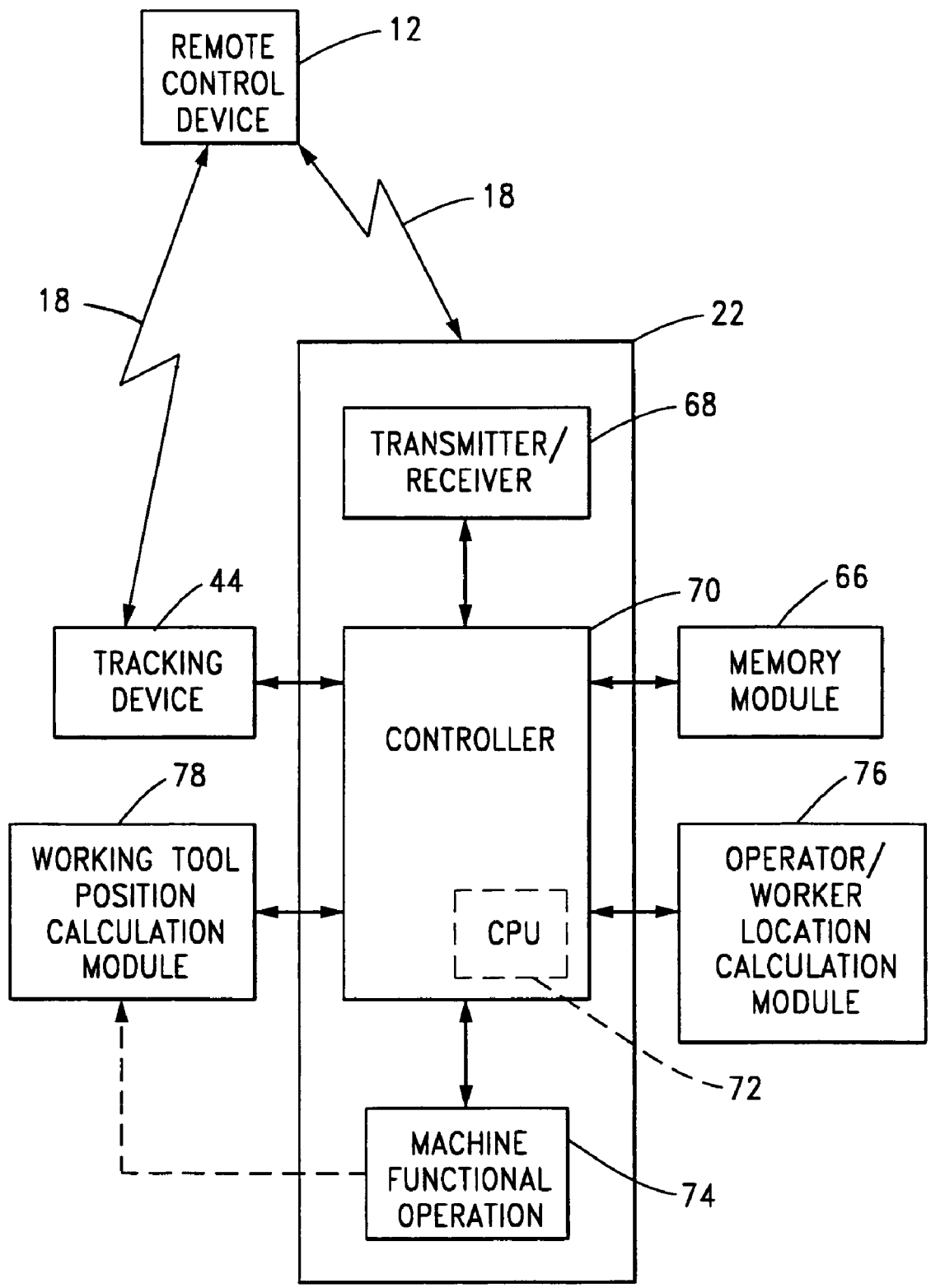
FIG. 7 is a block diagram of a remote control system capable of locating the position of the remote control operator.

The unique ID is used to modify the operating modes of the work machine 10 based upon the specific needs of the work tool 16. Additionally, the function of the controls of the control system may be modified to facilitate use of the work tool 16. Operating modes associated with each unique ID are stored in the machine controller memory module 66 (FIG. 7). With reference to FIG. 1, the work tool 16 comprises the loader bucket. An illustrative operating mode comprises use of the work machine 10 and bucket 16 for picking up soil from one location and stockpiling it up at a distant location for later use. The operator 30 uses the user input devices 34 to generate control commands used to move the unit to the pick up location and position the bucket for pickup. The work machine 10 and loader bucket are used in conjunction to carefully move into the soil and fill the bucket. Lift arms 20 and a bucket tilt cylinder (not shown) are used to quickly lift and curl the bucket in a transport position. The work machine 10 is moved to the stockpile where the payload is dumped by quickly raising the loader arms and uncurling the bucket. This cycle is repeated over and over until the work is complete.

In a second case the work tool 16 comprises a large diameter auger (not shown) for drilling shallow vertical holes in the soil for tree planting. The ground drive 14 is used to properly position the auger for drilling. Precise positioning requires careful modulation of the ground speed and steering. The auger is not used until the machine 10 is in a fixed position. An auxiliary hydraulic circuit provides power for auger rotation. Control is carefully modulated as the auger flights are slowly lowered into the soil to excavate the hole.

In yet another example, the work tool 16 may comprise a trencher consisting of a rotating chain with teeth used to excavate the soil along a predetermined path. Here the auxiliary circuit driving the trencher is typically operated at a fixed speed (or hydraulic flow), typically full speed. The trencher is lowered into the soil to the desired depth using lift arm 20. Using this work tool 16 the ground drive circuit is carefully modulated to engage the trencher into the soil for maximum utilization of available horsepower. Operation in this mode may continue for several hundred feet. Because this operation can be tedious, some products such as the Ditch Witch® RT 70 tractor are equipped with an automated cruise control to make modulation and control of the ground drive easier.

These and other examples summarized in Table 1 are included for illustrative purposes only and may not represent actual modes of operation. The work zone column values are essentially equivalent to minimum radial clearance $R_{min}$ (described earlier). Aux 1 and Aux 2 are power circuits that may be available on the machine 10 to provide power (typically hydraulic power) that may be necessary to operate the work tool 16.

TABLE 1

| Attachment or Tool | Ground Drive | Arm Lift | Tilt | Aux 1 | Aux 2 | Work Zone |
|---|---|---|---|---|---|---|
| Bucket | Normal Sensitivity w/ max speed of 6 mph | Normal | Normal | None | None | >6 ft (Front) >3 ft (Rear) |
| Trencher | Slow speed sensitivity w/ max speed of 2 mph when trenching. Enable Ground Drive Cruise Control | Normal | Normal | Full Speed, Constant Flow | None | >10 ft (Sides and front of Trencher) |
| Stump Grinder | Normal | Sensitive | Normal | Full Speed, Constant Flow | Slow cycle fore & aft | >15 ft Front and side of Attachment |
| Large Auger | Normal (none) | Sensitive | Sensitive | Sensitive (Auger Rotation) | None | >6 ft Diameter except at slow speed |
| Cement Mixer | Normal (none) | Normal | Normal | Fixed speed | None | >1 ft |

Whether or not the work machine 10 is remotely controlled, automated mode modification reduces the tedium and skill level required of the operator 30 to modulate various controls to effectively operate each work tool 16. Electric and pilot operated controls are common for the types of machines mentioned herein. Such controls can help the operator 30 with the various subtleties required for operation of the work machine 10. However without mode modification, the operator 30 would have to change the mode of operation or method in which he/she interacts with the various controls.

It should be clear that work tool identification information may be utilized to select a set of appropriately shaped and located operational sectors A, B, C, D (FIG. 2) around the work machine 10 from a pre-defined table of regions for the various work tools 16 used with a particular work machine 10. As explained above, when the work tool is an auger, the work machine's operating modes substantially differ from those of a work machine 10 having a loader bucket. A work cycle of "maneuver, closely position, and drill" replaces a "load, transport, lift, dump, and return" type of work cycle.

Turning now to FIG. 7, there is shown therein a block diagram of the control system of the present invention. The block diagram of FIG. 7 shows the remote controller 12 and machine controller 22. The machine controller 22 and remote controller 12 allow the operator 30 to operate the work machine 10 from afar much like a conventional remote control. The machine controller 22 comprises the transmitter/receiver assembly 68 and controller 70. The controller 70 comprises the previously discussed processor 72 that receives and converts the control signals 18 (FIG. 1) into commands that cause the work machine functional operation 74 by way of actuating various solenoid valves (not shown) and the like. The memory module 66 is provided for storing the previously described look-up tables for the array of work tools 16 and associated sets of operational sectors (A, B, C, D) and tables of minimum radial clearance $R_{min}$ for all location angles S. The memory module 66 may also store a history of the last few results, commands, or data sets provided by other system modules 76 and 78. This information may include: the most recent operational commands received from the remote controller 12, operational status information, and results of calculations performed—such as position of the work tool 16 and location (R, S) of the operator 30 and any authorized workers/observers. Manual keypad input and "automatic identifier" signals from personnel tags or intelligent work tools are also stored for present and future use.

In addition to having a table of minimum radial clearance $R_{min}$ associated with a particular machine 10 and work tool 16 combination, the operating characteristics of the work machine and work tool may also be modified based upon the operator's position within a given sector (A, B, C, D.). For example, if the work tool 16 were a loader bucket, there may be times where the operator 30 could accomplish improved operation if positioned very close to the loader bucket to observe it during loading. This would be the situation if the work machine 10 were working in a blind alley way. The operator 30 could not be in any other position to watch the loader bucket load. In this situation, to prevent inadvertent contact with the operator 30, machine speed might be limited to slow movements while lift height might be limited to less than three feet to prevent the operator 30 from being exposed to an overhead payload. Within these limitations, the desired task could still be accomplished.

The system shown in FIG. 7 may further comprise calculation modules 76 and 78 and the directional antenna assembly 44. The tracking device 44 operated under automated control of the controller 12 provides personnel location information to the location calculation module 76. The work tool position calculation module 78 determines the current position of the work tool 16 and converts this into a "real-time machine boundary" for input into the operator/worker location calculation module 76. Here the real-time machine boundary at location angle S is subtracted from the "distance away" data provided by the tracking device, yielding the radial clearance R. The controller 22 now allows or inhibits operator initiated control signals 18 on the basis of the location information (R, S) in conjunction with appropriate stored data from look-up tables, etc. in the memory module.

The work machine control system is an intelligent system that causes (or allows) a variety of possible work machine 10 and work tool 16 operational responses to an operator generated control command based on the type work tool 16 installed and the relative position of the operator 30. For instance, shut-down of the engine (Step 1120, FIG. 8) could instead be the limitation or prevention of certain machine functional operations—such as disengaging the ground drive, or slowing or stopping the work tool 16. Depending upon the operator's position relative to the work machine 10, his/her operational command inputs via joysticks, etc. on the remote controller 12 may be implemented by the machine controller 22 directly as received or they may be altered or even totally circumvented to mitigate risk to one's personal safety.

Figure 8:
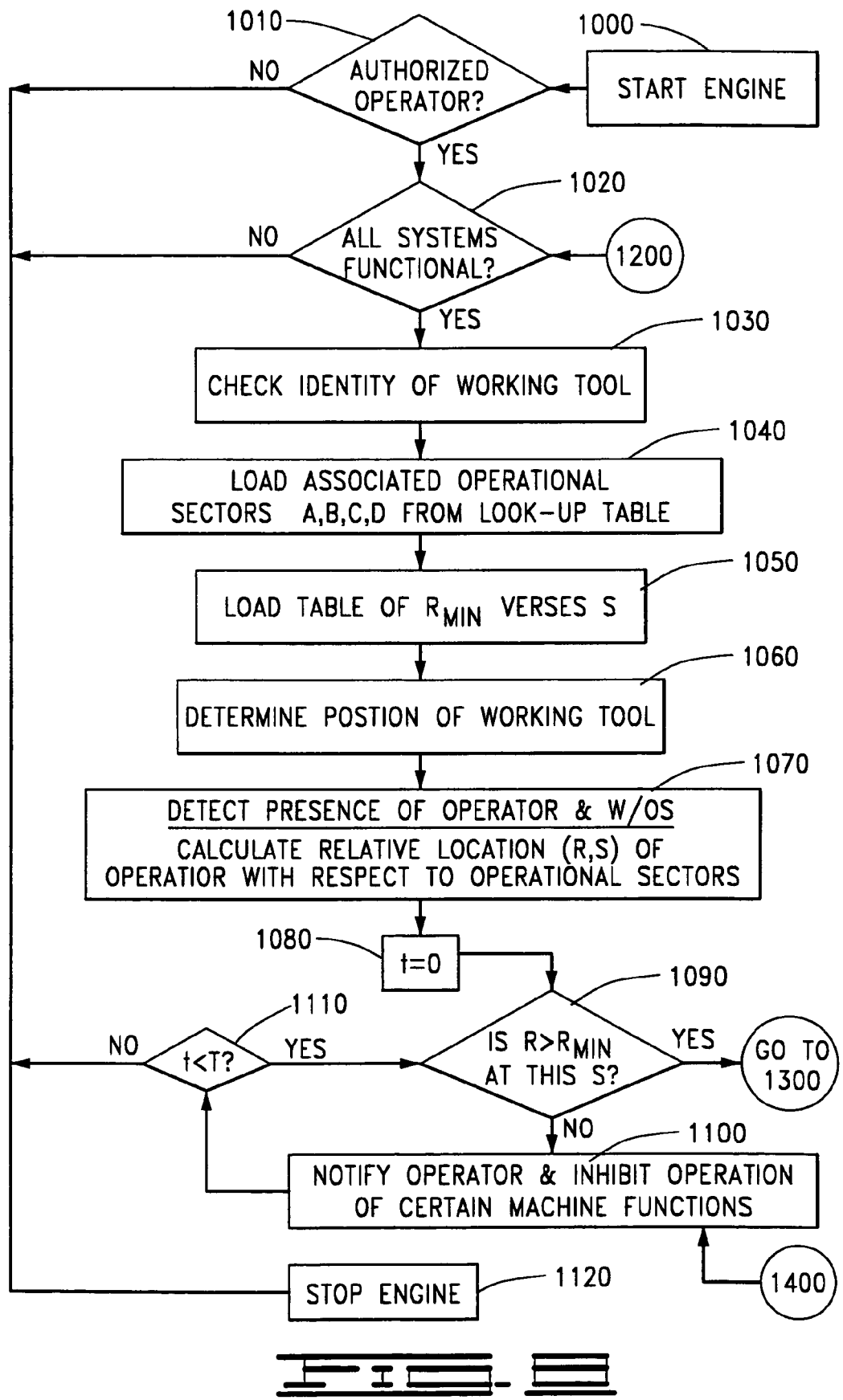
FIG. 8 is a flow chart illustrating a process for locating the relative position of a remote controller with respect to the work machine being controlled, then altering or controlling certain machine operations whenever a threshold clearance zone is breached.
Figure 8:
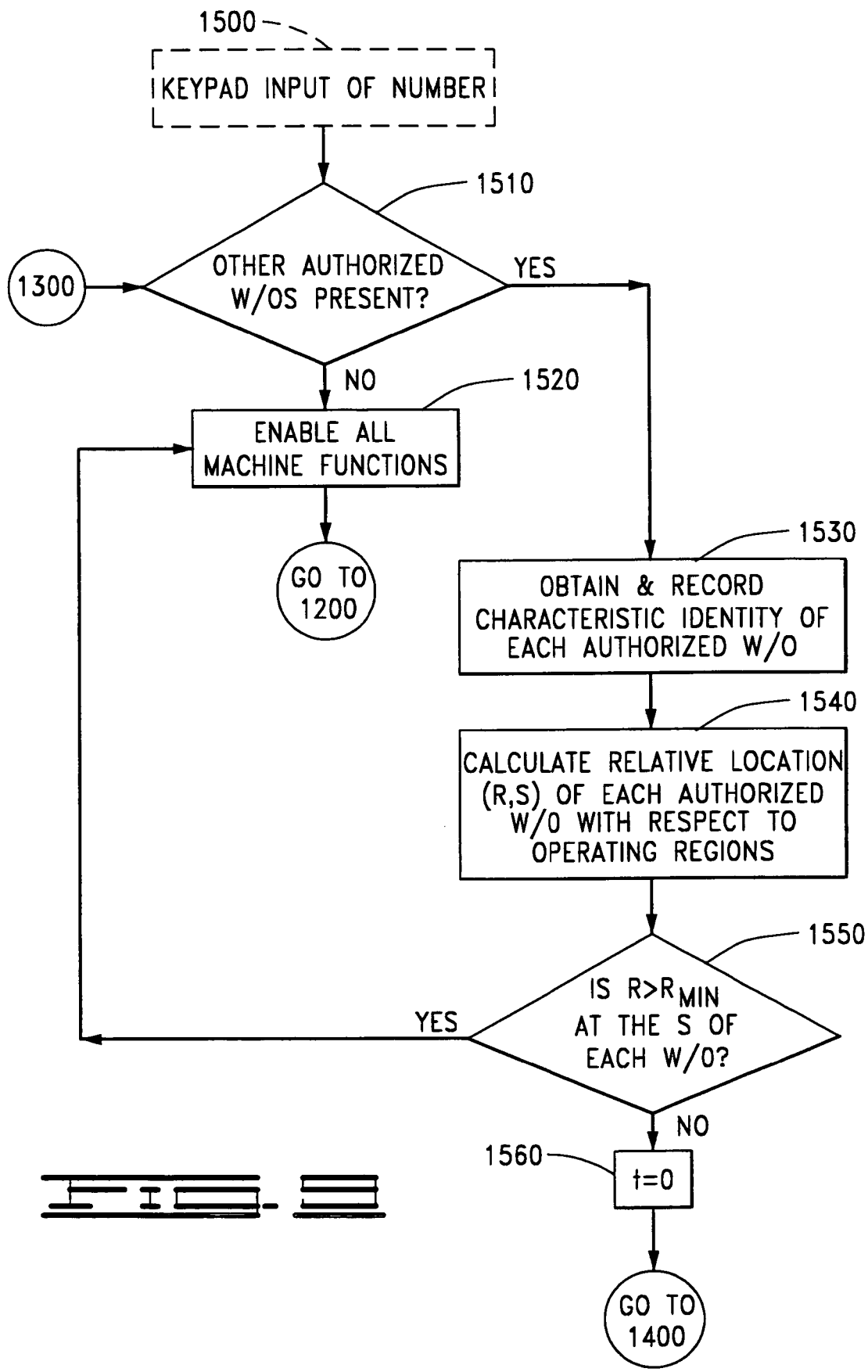

The control logic of FIGS. 8 and 9 begins when the operator 30 starts the engine of the work machine 10 at step 1000. The machine controller 22 calls upon the directional antenna assembly 44 to interrogate the operator's tag 38 (FIG. 1) and verifies the operator 30 is an authorized operator at step 1010. If the operator 30 is not authorized, the machine controller 22 shuts down the work machine engine at step 1120—or other appropriate action is taken. The machine controller 22 (FIG. 7) then verifies that all portions of the control system are functioning properly at step 1020. If not, the engine is shut down. Alternatively, instead of shutting down the engine, the operator 30 may be granted "limp home" control to move the work machine 10 to a repair facility. At step 1030 the type of work tool 16 is determined from its identity code (or manual input). The appropriately shaped operational sectors A, B, C and D and table of minimum radial clearance $R_{min}$ are loaded from memory at steps 1040 and 1050 to establish a set of work tool 16 operational characteristics. The controller 22, at step 1060, calls upon the work tool position calculation module 78 to determine the work tool position and the real-time operational boundary of the machine 10 and work tool. At step 1070 the directional antenna assembly 44 scans the local work area to locate the operator 30 and any tag wearing authorized workers or observers. First, the operator/worker location calculation module 76 determines whether the operator is positioned a proper distance R from the machine 10 and its work tool 16 (Steps 1070-1090). If the operator 30 and thus the remote controller 12 or ID tag 38 are within the operational boundary of the work tool 16 and work machine 10 (i.e., $R \leq R_{min}$), the operator is notified by a warning light or sound activated at the remote controller 12 and certain pre-designated machine functions are disabled or able to function only at a reduced level. The operator 30 is given an amount of time T to move to a favorable location (i.e., $R > R_{min}$) in the loop 1110, 1090, 1100 or the engine will shut-down at 1120. Time "T" is set to zero ahead of this loop, at step 1080. Alternatively, the machine controller 22 may allow only minimal function or no function of the work machine 10 and work tool 16 until the operator 30 is outside the operational boundary defined by $R_{min}$.

If the operator 30 moves into or is already in a favorable location (i.e., $R > R_{min}$), the control logic moves to 1300 shown in FIG. 9. Here, at step 1510, the directional antenna assembly 44 is interrogated by the controller 22 to determine the presence of other authorized workers or observers. Alternately, the operator 30 may manually enter their presence and number at step 1500. If no workers or observers are present, the full range of machine functions subject to the control parameters stored in the memory module 66 (FIG. 7) are enabled at step 1520 and program control repeatedly cycles back through an updating loop by returning to 1200 (FIG. 8). When worker or observers are present, the scanning directional antenna assembly 44 is called upon to obtain their characteristic identities at step 1530. Their location relative to the work machine 10 may already be known from the determination at step 1070. At steps 1540-1550 the operator/worker location calculation module 76 determines whether each of the workers or operators are positioned a proper distance R from the real-time operational boundary of the machine 10. If so, all machine functions are enabled at step 1520. If not, time "T" is set to zero at step 1560 and program control reverts to step 1400 (FIG. 8) where operation of certain machine functions may be inhibited. The operator 30 is made aware of the intrusion and given time "T" to correct it—or the engine shuts down (or certain operational functions are temporarily reduced until the intrusion is corrected). In this way, the operator 30 and tag wearing authorized worker or observer are prevented from being too close to an operating work machine 10.

The present invention also comprises a method for controlling operation of a work machine 10 comprising a plurality of operational characteristics. Control of the work machine 10 may be based, in part, on the location of the operator 30 relative to the work machine and the type of work tool 16 attached to the work machine. In a preferred method, a control signal 18 is generated by a remote controller 12 at a location remote from the work machine 10. The control signal 18 is detected at the work machine 10 by one of the receiving assemblies described herein. The machine controller 22, supported on the machine 10, processes the control signal 18 to determine the point of origin of the control signal relative to the work machine. After determining the point of origin of the control signal 18 and thus the location of the operator, the controller 22 controls or alters at least one of the plurality of operational characteristics of the work machine 10 or work tool 16 based upon the control signal 18 and the determined point of origin of the control signal. In accordance with the present invention, the method may further comprise establishing an operational boundary defined by the type of work tool 16 and the configuration of the work machine 10. In such cases, the operational characteristics, i.e. the allowed movements of the work tool 16 and work machine 10, may be modified based upon the location of the remote controller 12 or an observer within the machines operational boundary.

Still yet, the present invention includes a method for controlling operation of a work machine 10 having a plurality of machine signal transmitters supported on the work machine. The plurality of machine signals are detected at the receiver assembly 58. A processor supported by the receiver assembly 58 processes the detected machine signals to determine the location of the receiver assembly relative to the work machine 10. Alternatively, the distance determined from each machine transmitter 52, 54, 56 could be transmitted back to the machine 10 for processing by the machine controller 22. The machine controller 22 then may perform calculations to determine the operator's position relative to the work machine 10. Having the processor on the machine 10 reduces the power needed by the remote controller, thus conserving battery life. This alternative method provides equivalent data reliability with less power consumption. The receiver assembly 58 then transmits a control signal 18 from the receiver assembly to the work machine 10. The control signal 18 is processed by the machine controller 22 and used to control or alter an operational characteristic of the work machine 10 based upon the determined location of the receiver assembly 58 relative to the work machine 10. This method may also include establishing at least two operational sectors defined by the work machine 10 and the work tool 16. Work machine 10 and work tool 16 functions are then controlled by the remote controller 58 based upon the location of the either the operator 30 or workers and observers within certain of the operational sectors, as described above.

Various modifications can be made in the design and operation of the present invention without departing from the spirit thereof. Thus, while the principal preferred construction and modes of operation of the invention have been explained in what is now considered to represent its best embodiments, which have been illustrated and described, it should be understood that within the scope of the appended claims, the invention may be practiced otherwise than as specifically illustrated and described.

What is claimed is:

1. A system for controlling operation of a work machine, the system comprising:
   a signal system, positionable at a remote location from the work machine, comprising:
      a signal generator adapted to generate a control signal;
   a work tool, comprising a plurality of operational characteristics, operatively connected to the work machine and adapted for operation in response to the control signal from the signal system;
   a controller assembly supported by the work machine comprising:
      a receiver assembly adapted to detect the control signal from the signal generator; and
      a processor adapted to determine a location of the signal system relative to the receiver assembly using the detected control signal and to change at least one of the plurality of operational characteristics of the work tool based upon the position of the signal system relative to the receiver assembly.

2. The system of claim 1 wherein the signal system comprises a portable frame.

3. The system of claim 1 wherein the signal system further comprises at least one user input device adapted to generate a control command for communication to the controller assembly.

4. The system of claim 1 wherein the controller assembly further comprises a work machine transmitter assembly adapted to transmit work machine operation information to the signal system.

5. The system of claim 4 wherein the work machine operation information comprises a current operational status of the work machine.

6. The system of claim 1 wherein changing at least one of the plurality of operational characteristics of the work tool based upon the position of the signal system relative to the receiver assembly comprises limiting a range of motion of the work tool.

7. The system of claim 1 wherein the processor is further adapted to alter an operational characteristic of the work machine based upon the type of work tool operatively connected to the work machine.

8. The system of claim 7 wherein changing the operational characteristics of the work machine based upon the position of the signal system relative to the receiver assembly comprises restricting forward movement of the work machine when the signal system is determined to be in a position forward of the work machine.

9. The system of claim 1 wherein the work tool comprises a loader bucket.

10. The system of claim 1 wherein the receiver assembly comprises one or more directional antennas adapted to scan an area of operation to determine the location of the signal system.

11. The system of claim 10 wherein the directional antenna comprises a gimble mount to support the directional antenna on the work machine for movement in at least two planes.

12. The system of claim 10 further comprising a wearable tag adapted to transmit a unique identification signal to the receiver assembly when the receiver assembly scans the wearable tag, wherein the unique identification signal is used to determine the location of the tag relative to the work machine.

13. The system of claim 12 further comprising altering an operational characteristic of the work tool based upon the location of the tag relative to the work machine.

14. The system of claim 1 wherein the receiver assembly comprises at least two directional antennas adapted to detect the control signal from the signal system.

15. The system of claim 1 wherein the signal generator comprises a radio frequency generator and wherein the control signal comprises a radio frequency signal.

16. The system of claim 1 further comprising at least one operational sensor used to obtain information about the operating conditions of the work machine and wherein the operational sensor information is processed by the processor to change one or more of the operational characteristics of the work machine.

17. A work machine operable in response to a control signal generated by a signal system remote from the work machine, the work machine comprising:
   a controller assembly comprising:
      a receiver assembly adapted to detect the control signal from the signal system;

a work tool, comprising a plurality of operational characteristics, operatively connected to the work machine and adapted for operation in response to the control signal from the signal system; and a processor adapted to determine a position of the signal system relative to the receiver assembly using the detected control signal and to control or alter an operational characteristic of the work machine based upon the control signal or determined position of the signal system relative to the receiver assembly; wherein the processor is further adapted to change at least one of the plurality of operational characteristics of the work tool based upon the position of the signal system relative to the receiver assembly.

18. The work machine of claim 17 wherein the controller assembly further comprises a work machine transmitter assembly adapted to transmit work machine operation information to the signal system.

19. The work machine of claim 18 wherein the work machine operation information comprises a current operational status of the work machine.

20. The work machine of claim 17 wherein changing at least one of the plurality of operational characteristics of the work tool based upon the position of the signal system relative to the receiver assembly comprises limiting a range of motion of the work tool.

21. The system of claim 17 wherein the processor is further adapted to alter the operational characteristic of the work machine based upon the type of work tool operatively connected to the work machine.

22. The work machine of claim 17 wherein changing at least one of the plurality of operational characteristics of the work machine based upon the position of the signal system relative to the receiver assembly comprises restricting forward movement of the work machine when the signal system is determined to be in a position forward of the work machine.

23. The work machine of claim 17 wherein changing at least one of the plurality of operational characteristics of the work machine based upon the position of the signal system relative to the receiver assembly comprises restricting rearward movement of the work machine when the signal system is determined to be in a position behind of the work machine.

24. The work machine of claim 17 wherein the receiver assembly comprises a directional antenna adapted to scan an area of operation to determine the location of the transmitted control signal.

25. The work machine of claim 17 wherein the receiver assembly comprises at least two antennas adapted to detect the control signal.

26. A method for controlling operation of a work tool operatively connected to the work machine, the work tool having a plurality of operational characteristics, the method comprising:

identifying the type of work tool connected to the work machine;

establishing a set of work tool operational characteristics;

generating a control signal at a location remote from the work machine;

detecting the control signal using a receiver assembly at the work machine;

processing the control signal to determine a point of origin of the control signal relative to the work machine;

monitoring changes in the point of origin of the control signal; and changing the set of work tool operational characteristics based upon the position of the point of origin of the control signal relative to the work machine.

27. The method of claim 26 further comprising altering at least one of a plurality of operational characteristics of the work machine based upon the point of origin of the control signal.

28. The method of claim 26 further comprising establishing an operational boundary defined by the work tool and the work machine.

29. The method of claim 26 further comprising processing the control signal to control operation of the work tool.

30. The method of claim 26 further comprising processing the control signal to control operation of the work machine.

31. The method of claim 26 wherein determining the point of origin of the control signal relative to the work machine comprises measuring the strength of the control signal at the work machine.

32. The method of claim 27 further comprising determining at least two operational sectors defined by the work tool and the work machine.

33. The method of claim 32 further comprising controlling or altering at least one of the plurality of operational characteristics of the work tool based upon the point of origin of the control signal being within one of the operational sectors.

34. The method of claim 26 wherein the work tool comprises a loader bucket and wherein one of the plurality of operational characteristics of the work tool comprises a range of motion of the work tool.

35. The method of claim 28 wherein the control signal is generated by a remote control assembly, the method further comprising determining a location of the remote control assembly relative to the operational boundary comprising:

transmitting a plurality of electromagnetic fields from the work machine; and receiving the plurality of electromagnetic fields at the remote control assembly; and calculating the distance from remote control assembly to the work machine using each of the plurality of electromagnetic fields.

36. The method of claim 26 further comprising:

determining an operating condition of the work machine and work tool;

loading at least one operational characteristic of the work tool and the work machine based upon the operating conditions of the work machine and work tool; and altering at least one of the plurality of operational characteristics of the work machine or the work tool based upon a change in the operating condition of the work machine or work tool.

* * * * *